United States Patent

Thomas

[15] 3,647,992

[45] Mar. 7, 1972

[54] ADAPTIVE ECHO CANCELLER FOR NONLINEAR SYSTEMS

[72] Inventor: Edmond Joseph Thomas, Matawan, N.J.

[73] Assignee: Bell Telephone Laboratories, Incorporated, Murray Hill, N.J.

[22] Filed: Mar. 5, 1970

[21] Appl. No.: 16,745

[52] U.S. Cl. ........ 179/170.2

[51] Int. Cl. ........ H04b 3/20, H04m 9/08

[58] Field of Search ........ 179/170.2

[56] References Cited

UNITED STATES PATENTS 3,465,106 9/1969 Nagata ........ 179/170.2

3,500,000 3/1970 Kelly et al. ........ 179/170.2

*Primary Examiner*—Kathleen H. Claffy

*Assistant Examiner*—William A. Helvestine

*Attorney*—R. J. Guenther and William L. Keefauver

[57] ABSTRACT

Operation of a closed-loop echo cancellation system for use in a two-way communication circuit is improved by employing a multidimensional network capable of approximating a large class of nonlinear transfer functions, and a control circuit arrangement for automatically adjusting parameters of the network. Signals incoming to a four-wire to two-wire junction are supplied to the network which, supplied with an error signal derived from signals in the outgoing path, develops a replica of an undesired echo. The replica signal is subtracted from outgoing signals and the differential is used for the derivation of a new error signal.

12 Claims, 2 Drawing Figures

Patented March 7, 1972 3,647,992

2 Sheets-Sheet 1

INVENTOR
E. J. THOMAS
BY A. E. Hirsch Jr.
ATTORNEY

ADAPTIVE ECHO CANCELLER FOR NONLINEAR SYSTEMS

This invention relates to the suppression of echoes in communication channels and more particularly to the effective cancellation of echoes in a two-way telephone circuit of extremely long length such as, for example, a circuit completed by way of a satellite repeater in orbit about the earth, or other circuits characterized by nonlinearities. Its principal object is to afford improved protection against echoes irrespective of the length of the transmission circuits in use or their lack of linearity.

BACKGROUND OF THE INVENTION

Echoes occur in telephone circuits when electrical signals meet imperfectly matched impedance junctions and are partially reflected back to the talker. Because such signals require a finite travel time, this reflected energy, or echo, is heard some time after the speech is transmitted. As distances increase, the echo takes longer to reach the talker and becomes more and more annoying. An attempt is therefore generally made to control these reflections with voice-operated devices, known as echo suppressors.

Conventional echo suppressors combat echoes generated at hybrid junctions in long distance communications circuits by interrupting the outgoing, or return, path according to some decision based upon the relative levels of the incoming and outgoing signals. Since an interruption of the return signal path also interrupts the outgoing signal circuit, the use of such suppressors, particularly in extremely long circuits, causes much talker confusion. In effect, such echo suppressors introduce chopping of the outgoing signal during periods of double-talking, i.e., during periods when the two speakers are talking simultaneously. It is apparent therefore that cancellation of echoes in the return signal path without an interruption of the path itself is desirable for satisfactory communications in circuits of extended length.

It is thus an object of this invention to improve the quality of speech or other communications signals transmitted over long distance circuits by substantially eliminating echo returns without impeding the free flow of conversation in both directions.

DISCUSSION OF THE PRIOR ART

One solution to the problem is disclosed in J. L. Kelly, Jr.-B. F. Logan, U.S. Pat. No. 3,500,000, granted Mar. 10, 1970. In the Kelly-Logan patent, a replica of the echo is developed by synthesizing a linear approximation to the echo transmission path, and the replica signal is subtracted from the return signal. Such a system, which is aptly described as an echo canceller to distinguish it from conventional echo suppressors, is characterized by a closed loop error control system. It is self-adapting in that it automatically tracks variations in the echo path which may arise during a conversation, for example, as additional circuits are connected or disconnected. Since the circuit outgoing from a hybrid junction is not actually broken in the presence of an echo, double-talking is possible even though both subscribers are relieved of echo confusion.

The closed-loop echo canceller described in the Kelly-Logan patent synthesizes a linear approximation to the echo transmission path by means of a transversal filter. In conventional fashion, the filter comprises a delay line having a number of taps spaced along its length at Nyquist intervals. It develops a number of delayed replicas of the applied signal, each of which is independently adjusted in gain and polarity in response to the degree of echo present in the outgoing circuit. The adjusted signals are then algebraically combined and subtracted from signals in the outgoing circuit. The theory of operation and proof of convergence of the closed loop canceller are based on the linear treatment of a plurality of delayed signals, $x_i(t)$, adjusted in gain by a series of functions $g_i(t)$.

Convergence and suppression are achieved with a greatly simplified generalized network arrangement used in apparatus described by M. M. Sondhi (3) in a copending application, Ser. No. 590,583, filed Oct. 31, 1966, now U.S. Pat. No. 3,499,999. In the Sondhi application, a network comprised of pairs of bandpass filters is used to replace the linear delay line system previously used. Preferably, Sondhi employs an active RC ladder network adjusted to give Laguerre function impulse responses.

It has been observed that linear canceller arrangements as described in the prior art fail to provide adequate cancellation when used in systems in which nonlinearities, especially those arising from the use of compandors or signalling units in the connecting circuits, are exhibited.

SUMMARY OF THE INVENTION

Accordingly, it is a further object of this invention to overcome these and other difficulties and to assure full echo cancellation, notwithstanding considerable nonlinearity and a wide range of transfer functions.

Thus, the invention is directed to an improvement in a closed-loop echo canceller of the sort described by Kelly and Logan. Unlike the echo canceller arrangements of Kelly-Logan or Sondhi, however, which develop a replica of an echo by synthesizing a linear approximation to the echo transmission path and passing incoming signals through it, it is in accordance with this invention to develop a replica signal from a system that synthesizes a nonlinear approximation to the echo path, and which automatically tracks changes in its transfer function. The echo path accordingly is simulated by developing, from signals incoming to the junction, coefficient values of an $n$-dimensional generalized Fourier series which defines the transfer function of the nonlinear echo path. With the aid of feedback from signals in the outgoing circuit, the coefficients are constantly corrected until they converge to define a synthesizer capable of producing an almost exact replica of the echo. When such a replica signal is subtracted from the outgoing signal, all residual echo in the outgoing circuit vanishes.

Coefficients of the required Fourier series are produced, for example, from signals produced by a tapped delay line, as proposed by Kelly-Logan, or a Laguerre network, as proposed by Sondhi, or a similar transversal filter arrangement. Sets of signals derived from the network arrangement are selectively combined to produce product signals taken one at a time, two at a time, $m$ at a time, and so on. Each group of product signals is then processed in an adaptive network of the sort employed by Kelly-Logan to develop a coefficient signal. The coefficient signals are summed by groups and finally the group summations are combined to form a replica of the echo signal. As the number of individual product signals is increased, the precision with which the replica signal is produced is improved. Most importantly, by constantly reevaluating the coefficients from an examination of the echo content in the outgoing circuit, the system converges to yield the generalized Fourier coefficients so that the replica signal closely approximates the echo signal notwithstanding nonlinearities arising because of associated circuit apparatus, or the like.

Although the novel features of the invention serve ideally to improve the operation of an echo canceller, they may also be used in other related applications. For example, the closed loop arrangement may be used to establish parameters necessary to linearize a nonlinear network, or for synthesizing the electrical characteristics of a nonlinear system.

BRIEF DESCRIPTION OF THE DRAWINGS

The invention will be more fully comprehended from the following detailed description of an illustrative embodiment thereof taken in connection with the appended drawings, in which.

DETAILED DESCRIPTION

Figure 1:
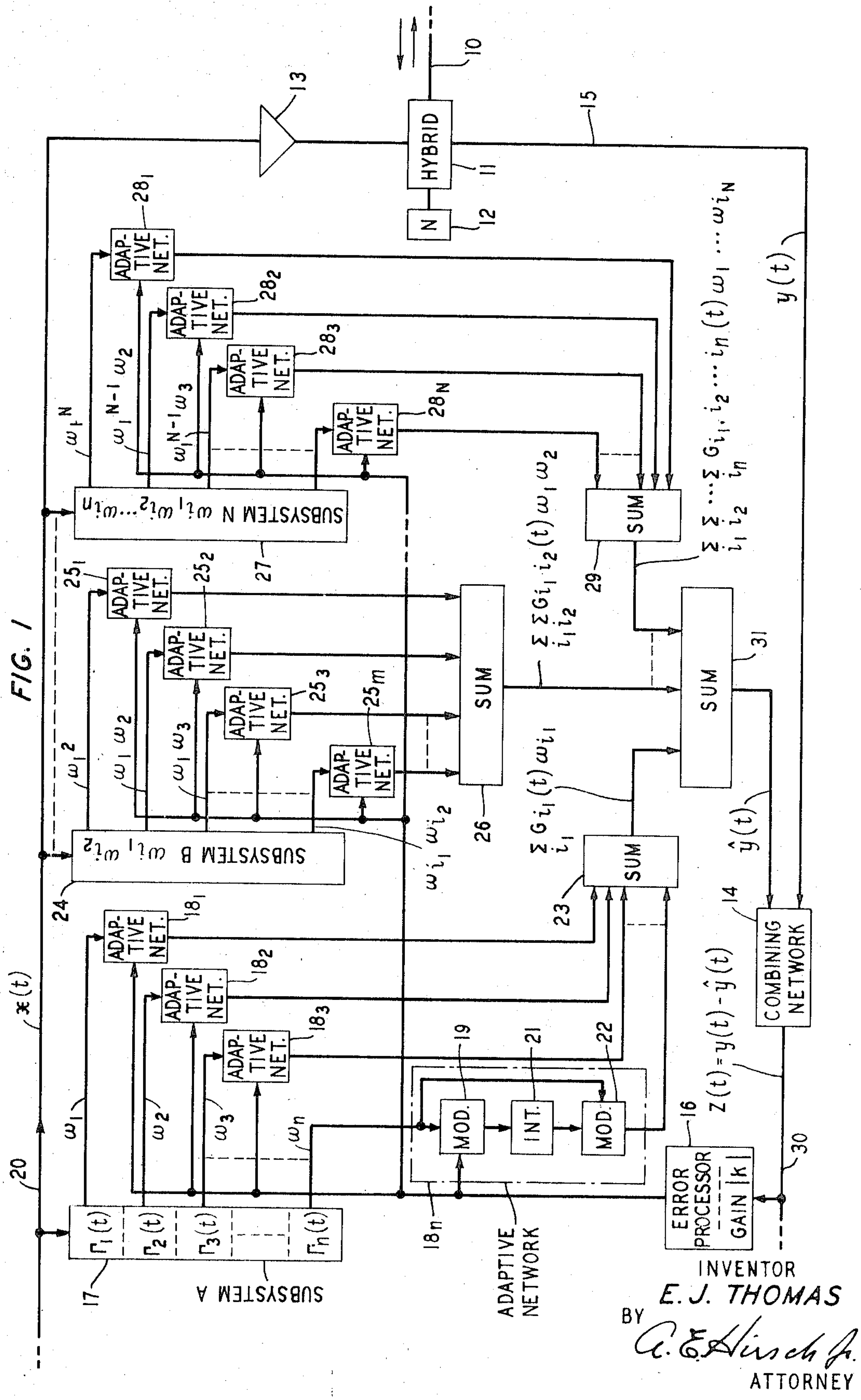
FIG. 1 is a block schematic diagram showing an adaptive echo canceller embodying the principles of the invention connected in circuit relation with a hybrid junction.

FIG. 1 illustrates a signal transmission terminal for interconnecting a single two-way circuit 10 with two one-way circuits 20 and 30. Local circuit 10 typically is a conventional two-wire telephone circuit connecting a subscriber to incoming circuit 20 and to outgoing circuit 30 by way of hybrid network 11. The impedance of local circuit 10 is matched, insofar as possible, by balancing network 12 associated with hybrid 11. Ideally, all incoming currents received from transmission link 20 are delivered by way of isolating amplifier 13 and hybrid 11 to local circuit 10. None of the energy should be transferred to outgoing circuit 30. Similarly, all of the energy reaching hybrid 11 from local circuit 10 should be delivered to outgoing circuit 30. Unfortunately, the balancing network generally provides only a partial match to the two-wire circuit 10 so that a portion of the incoming signal from circuit 20 reaches outgoing circuit 15. In the absence of adequate suppression of this signal component, it accompanies outgoing signals which originate in circuit 10 and is delivered to transmission line 30. Upon reaching the distant station, this signal component, which originated at the distant station in the first place, is perceived as an echo. Accordingly, echo cancellation apparatus is employed to eliminate the return signal.

In accordance with the Kelly-Logan patent apparatus, the echo signal is cancelled without interrupting either the incoming or the outgoing circuits. Incoming signals $x(t)$ in circuit 20 are passed through a linear network 17, adjusted in accordance with the transfer function of the hybrid system by means of adaptive networks $\mathbf{18_1}$, $\mathbf{18_2}$, $\mathbf{18_n}$ to produce upon summation in adder 23, a replica of the echo signal. The replica signal is algebraically subtracted, for example, in combining network 14, from signals $y(t)$ leaving hybrid 11 via circuit 15 to produce a signal $z(t)$ in circuit 30 substantially devoid of echo components. A control loop, supplied with signals from outgoing circuit 30 by way of error processor 16, continuously adjusts the linear system, e.g., by control of networks 18, so that it follows fluctuations in the echo path. Yet, if nonlinearities exist in the echo path, even these corrections are not sufficient to provide adequate cancellation. Nor is the inclusion of a nonlinear function in error processor 16 a help in overcoming this deficiency.

Accordingly, an additional arrangement of multidimensional orthonormal filters is employed in this invention. Full cancellation is achieved by approximating a large class of nonlinear transfer functions and by automatically adjusting the filters to produce coefficients of the transfer function. Incoming signals passed through the multidimensional network yield replicas of the echo even though they arise in nonlinear circuits.

Before describing the apparatus which illustrates the operation of the invention, it is believed helpful to set forth some of the theoretical considerations upon which the invention is based.

For linear systems, it is well known that the impulse response of a system completely determines the input-output relationship. The output signal, $y(t)$, is functionally related to the input, $x(t)$, by the convolution integral, $$y(t)=\int_{-\infty}^{\infty} h(\tau)x(t-\tau)dt, \qquad (1)$$

where $h(t)$ is the system impulse response. Nonlinear systems, whose outputs do not depend on the infinite past, obey a more general functional relationship, $$y(t)=h_0(t)+\int_{-\infty}^{\infty} h_1(\tau_1)x(t-\tau_1)d\tau_1$$

$$+\int_{-\infty}^{\infty}\int_{-\infty}^{\infty} h_2(\tau_1,\tau_2)x(t-\tau_1)x(t-\tau_2)\,d\tau_1 d\tau_2 \qquad (2)$$

$$+\sum_{n=3}^{\infty}\int_{-\infty}^{\infty}\cdots\int_{-\infty}^{\infty} h_n(\tau_1,\ldots,\tau_n)\prod_{i=1}^{n} x(t-\tau_i)d\tau_i.$$

This is an extension of the familiar power series representation of a memoryless nonlinear system, and provides for the system to have memory. It is applicable to all nonlinear systems whose outputs depend on the remote past to a vanishingly small extent. The terms of equation (2) are called Volterra functionals and the kernels, $h_n(\tau_1, -\tau_n)$, are generally called Volterra kernels.

Since Volterra kernels are square integrable, they may be represented by an $n$-dimensional generalized Fourier series $$h_n(\tau_1,\tau_2,\ldots,\tau_n)=\sum_{i_1=1}^{\infty}\sum_{i_2=1}^{\infty}\cdots\sum_{i_n=1}^{\infty} C_{i_1,i_2,\ldots,i_n}$$

$$\cdot\,\Gamma_{i_1}(\tau_1)\Gamma_{i_2}(\tau_2)\ldots\Gamma_{i_n}(\tau_n). \qquad (3)$$

where $[\Gamma_i(t)]$ is a complete filter set. The impulse responses of tapped delay lines or Laguerre networks are typical sets. The coefficients of (3) are given by $$C_{i_1,i_2,\ldots,i_n}=\int_0^{\infty}\int_0^{\infty}\cdots\int_0^{\infty} h_n(\tau_1,\tau_2,\ldots,\tau_n)$$

$$\cdot\,\Gamma_{i_1}(\tau_1)\Gamma_{i_2}(\tau_2)\ldots\Gamma_{i_n}(\tau_n)d\tau_1\ldots d\tau_n. \qquad (4)$$

If it is assumed that the highest ordered nonlinearity is of order N, then:

$$y(t)=\sum_{n=1}^{N}\sum_{i_1=1}^{\infty}\sum_{i_2=1}^{\infty}\cdots\sum_{i_n=1}^{\infty} C_{i_1,i_2,\ldots,i_n}$$

$$\int_0^{\infty}\Gamma_{i_1}(\tau_1)x(t-\tau_1)d\tau_1$$

$$\ldots\int_0^{\infty}\Gamma_{i_n}(\tau_n)x(t-\tau_2)d\tau_n. \qquad (5)$$

To simplify notation, define $$\sum_{I_n}(\cdot)\equiv\sum_{i_1=1}^{\infty}\sum_{i_2=1}^{\infty}\cdots\sum_{i_n=1}^{\infty}(\cdot). \qquad (6)$$

$$C_{I_n}\equiv C_{i_1,i_2,\ldots,i_n}. \qquad (7)$$

and $$w_{i_n}\equiv\int_0^{\infty}\Gamma_{i_n}(\tau_n)x(t-\tau_n)d\tau_n. \qquad (8)$$

Thus, (5) may be written:

$$y(t)=\sum_{n=1}^{N}\sum_{I_n} C_{I_n}w_{i_1}w_{i_2}\ldots w_{i_n}. \qquad (9)$$

Thus, in addition to the adjustment of each of adaptive networks 18 (FIG. 1) to the value of a coefficient of a linear transfer function, it is in accordance with this invention to employ additional networks to produce the coefficients of equation (9).

Returning to the apparatus of FIG. 1, suitable transfer function coefficients are developed by means of a plurality of subsystems, each arranged to develop a set of selectively altered output signals. Subsystem A (including filter 17, networks 18, and summing unit 23) thus corresponds to the arrangement used in prior art systems. Each section of generalized network 17 is characterized by a transfer response from the filter set $\Gamma_n(t)$ and develops signals $w_1, w_2, - w_n$ from signals $x(t)$ supplied from incoming circuit 20. Generalized network 17 may comprise a delay line tapped at Nyquist intervals, or a Laguerre network. These signals are delivered to adaptive networks 18, $\mathbf{18}_2$, – $\mathbf{18}_n$ where they are adjusted in accordance with an error signal derived from the composite output signal appearing in circuit 30. Accordingly, signal $w_n$ is delivered to adaptive network $\mathbf{18}_n$, where it is mixed in modulator 19 with a signal derived from error processor 16. Processor 16, supplied with signals from circuit 30, includes a network which exhibits a monotonic increasing odd function toward applied signals. Typically, the processor includes an amplifier with gain $k$ and, if desired, an infinite clipper or other nonlinear network. The product signal from modulator 19 is delivered to integrator 21. The integrated signal, identified as $G_n$, eventually becomes a close approximation to the coefficient $C_n$ of equation (9). This signal is adjusted in gain by the value of signal $w_n$ in unit 22 and delivered, together with the output signals produced by the other adaptive networks 18, to summation network 23. The summed signal is denoted:

$$\sum_i G_i(t) w_i . \qquad (10)$$

Subsystem B is supplied with signals incoming on circuit 20 and produces products of the signals w, derived from a generalized network or the like in unit 24, taken two at a time, e.g., $w_1^2, w_1w_2, w_1w_3, - w_{i_1} w_{i_2}$. The altered, or product, signals are delivered to adaptive networks $\mathbf{25}_1, \mathbf{25}_2, - \mathbf{25}_m$, which may be identical to adaptive network $\mathbf{18}_n$, and the resultant signals are delivered to summation network 26 to produce a summation signal:

$$\sum_{i_1}\sum_{i_2} G_{i_1 i_2}(t) w_{i_1} w_{i_2} . \qquad (11)$$

Similarly, additional subsystems are employed to develop product signals taken three at a time, four at a time, and so on through N at a time, depending on the number of Fourier coefficients required. In practice, it has been found that from four to six subsystems yield acceptable results. Thus, network 27 is subsystem N develops signals $w_i \; w_i , - w_i$ . These product signals are processed in adaptive networks $\mathbf{28}_1$, $\mathbf{28}_2$, $\mathbf{28}_N$, supplied with signals from error processor 16, and the resultants are delivered to network 29 to produce a summation signal:

$$\sum_{i_1}\sum_{i_2} \cdots \sum_{i_N} G_{i_1, i_2, \ldots, i_N}(t) W_{i_1} \ldots W_{i_N} . \qquad (12)$$

All of the coefficient signals developed in summation networks 23, 26 and others (not shown) through 29, are delivered to summation network 31 to form a replica signal $\hat{y}(t)$ which closely approximates any echo component which may have traversed hybrid 11 and which appears as a component of signal $y(t)$ in circuit 15. This replica signal is subtractively combined with the signal in circuit 15, for example, in combining network 14, and the resultant signal $$Z(t) = y(t) - \hat{y}(t) \qquad (13)$$

is delivered to outgoing circuit 30.

In a fashion analogous to that used by Kelly and Logan, it may be shown mathematically that the selectively altered signals, $G_I(t)$, of the system converge to the generalized Fourier coefficient $C_{I_n}$ of equation (4) and, consequently, that the replica signal $\hat{y}(t)$ at the output of summation network 31 (FIG. 1) converges to $y(t)$, so that all residual echo $Z(t)$ vanishes. The rate of convergence is dependent, among other things, on the gain $|k|$ of processor 16. Generally, as $|k|$ is increased, the quicker convergence is achieved.

Figure 2:
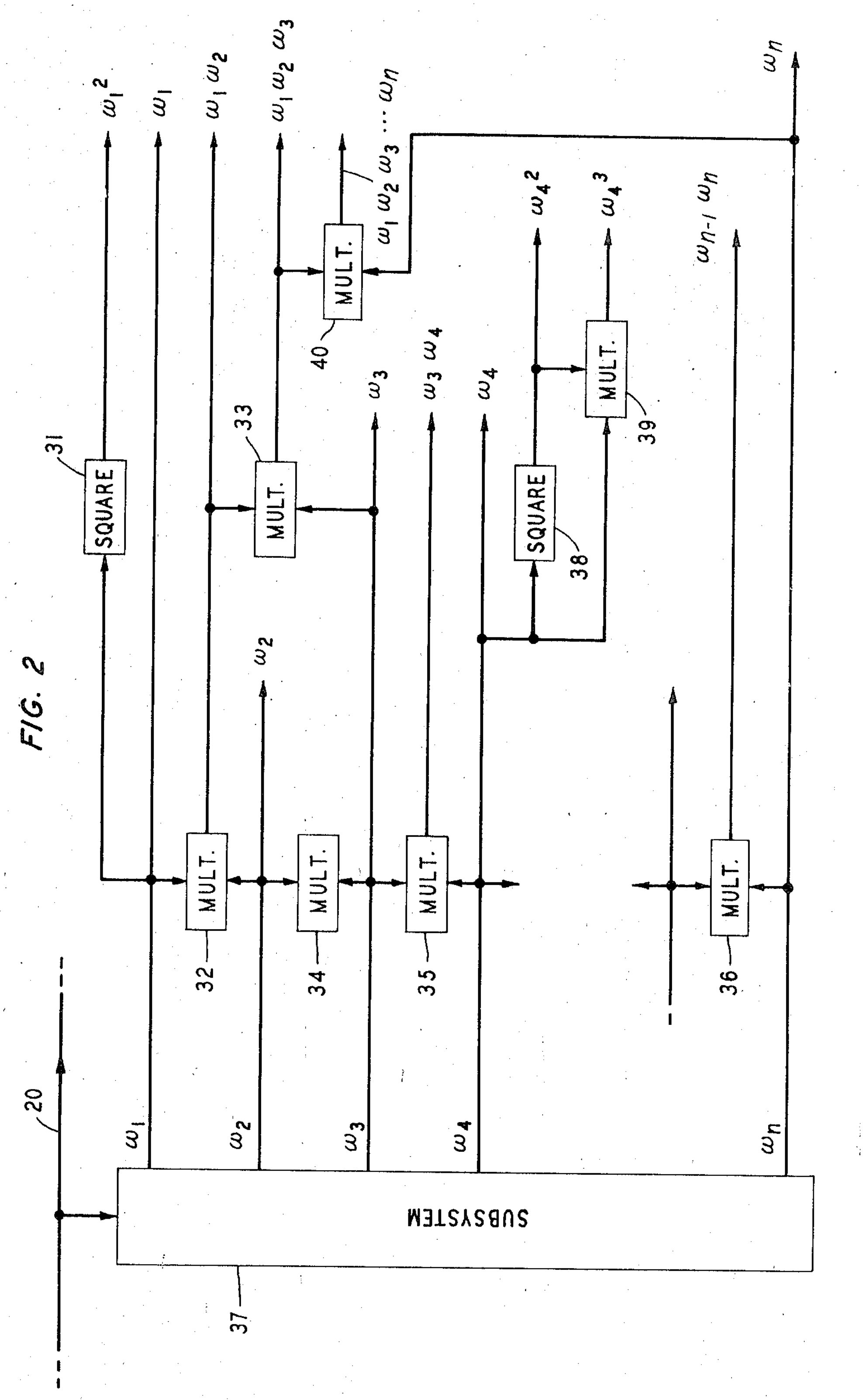
FIG. 2 is a block schematic diagram illustrating a preferred implementation of a portion of the arrangement depicted in FIG. 1.

It is apparent that the several product signals developed in the apparatus of FIG. 1 utilize signals $w$ which are available at the output of network 17 of subsystem A. Accordingly, and in accordance with a preferred embodiment of the invention, a single subsystem network, e.g., 17, of FIG. 1 may be employed together with appropriate combining circuits to produce the multiple product signals developed by all of the subsystems in the arrangement of FIG. 1. FIG. 2 illustrates, in simplified form, such an embodiment.

In FIG. 2, signals $w$, developed from signals $x(t)$ in incoming circuit 20 by way of network 37, are selectively crossmultiplied with other signals to produce the required product values. For example, signal $w_1$ is available directly for use in adaptive network $\mathbf{18}_1$, in the apparatus of FIG. 1. It is passed through squaring circuit 31 to produce a signal $w_1^2$. It is also delivered to multiplier network 32, together with signal $w_2$, to produce the product $w_1w_2$. Signal $w_1w_2$ is available for use in adaptive network $\mathbf{25}_2$ in the apparatus of FIG. 1, and is also supplied to multiplier 33 where it is combined with signal $w_3$ to produce signal $w_1w_3$. Evidently, by the use of a system of crossmultipliers, squaring, cubing and other power networks, all of the necessary product signals through $w_{i_1}, w_{i_2}, w_{i_N}$ are made available for delivery to associated adaptive networks. Further, since it may be shown that Volterra kernels used in defining the signals $w$ are symmetrical, the signal $w_1w_2$ is equivalent to signals $w_2w_1$. Since this symmetry holds for all corresponding kernels, a considerable reduction in the required number of individual product signals may be obtained.

Although the apparatus for developing a nonlinear transfer function has been illustrated by means of analog apparatus, it will be evident to those skilled in the art that equivalent digital circuit techniques may also be employed, and in some cases may achieve circuit economies. Moreover, it will be readily apparent that the principles of the invention may be employed in other than echo canceller applications. Assume, for example, that the nonlinear circuit arrangement of FIG. 1 is to be linearized such that the resulting output, $z(t)$ can be expressed by the linear convolution integral, $$z(t) = \int_0^\infty h_1(\tau_1) x(t-\tau_1) d\tau_1 . \qquad (14)$$

This can be done by first allowing the adaptive system of FIG. 1 to converge long enough so that the members of the set $G_I(t)$ can be considered to equal the corresponding members of the set $C_I$ . After convergence, the members of the set $G_I$ are forced to zero while the members of the sets $G_{I_j}, j \neq 1$ are fixed at the values determined previously. As a result the compensated output will satisfy equation (14). Similarly, the electrical characteristics on a nonlinear system which cannot be brought into the laboratory may be studied by making input/output tape recordings of the system, and using them as an input to a computer simulation of the adaptive system of FIG. 1. A good choice of an input signal is white noise or any other easily generated broadband signal. By allowing the simulation to converge and then fixing the tap gains $G_{I_n}$ at their final value, the nonlinear characteristics can be identified. It may then be determined how the field system will behave for any arbitrary input by applying this input to the computer simulation with the tap gains fixed at the values determined previously. Yet other variations and modifications will occur to those skilled in the art without, however, departing from the spirit and scope of the invention.

What is claimed is:

1. An echo canceller which comprises:

adjustable signal-processing means connected to receive signals from the first of two one-way transmission paths of a communication system, said processing means including a generalized network for producing a plurality of combinations of selected transformations of signals received from said first one-way path, means connected in the second of said two one-way paths for differentially combining signals in said second path with signals supplied from said processing means, and means responsive to said differentially combined signals for adjusting said processing means.

2. An echo canceller as defined in claim 1, wherein, said generalized network comprises a delay line system tapped for providing signals at Nyquist intervals, a plurality of interconnected multiplier networks selectively supplied with said Nyquist interval signals for developing products thereof in defined combinations, means for selectively weighting said product signals in accordance with the magnitude of signals from the second of said one-way paths, and means for adding all of said weighted signals together.

3. An echo canceller insensitive to transmission path nonlinearities which comprises:

adjustable signal processing means connected to receive signals from the first of two one-way transmission paths of a communication system, said processing means including a multidimensional system of orthonormal filters for producing a plurality of transformations of signals received from said first one-way path, and means for selectively summing all of said transformation;

means connected in the second of said two one-way paths for combining signals in said second path with said summation of transformation signals; and means responsive to said combined signals for adjusting said processing means.

4. An echo canceller as defined in claim 3, wherein, said system for producing a plurality of signal transformations comprises, a plurality of generalized filter networks, each adapted to develop selectively altered versions of signals supplied from said first one-way path, an arrangement of multiplier means associated with each of said networks for developing products of said altered versions of signals taken *n* at a time where values of *n* from 1 to N are assigned respectively to each of said arrangements, and means for adjusting each of said product signals in accordance with a function of said combined signal.

5. An echo canceller as defined in claim 3, wherein, said system for producing a plurality of signal transformations comprises, a generalized filter network adapted to develop selectively altered versions of signals supplied from said first one-way path, a plurality of arrangements of multipliers for developing products of said altered versions of signals taken *n* at a time where values of *n* from 1 to N are assigned respectively to each of said arrangements, and means for adjusting each of said product signals in accordance with a function of said combined signal.

6. An echo canceller as defined in claim 4, wherein, each of said plurality of generalized filter networks includes a transversal filter for producing signals at Nyquist intervals.

7. An echo canceller a defined in claim 4, wherein, each of said plurality of generalized filter networks includes a cascaded chain of individual Laguerre networks.

8. In a closed loop, adaptive echo cancellation system for use in a two-way communications signal circuit, the combination which comprises:

a processing network supplied with signals incoming to a four-wire to two-wire junction for developing a plurality of selectively altered signals, means for combining said altered signals to produce a plurality of combinations of all of said altered signals taken *n* at a time, where *n* is selected to range from $n=1$ to $n=N$, means for selectively mixing each of said combined signals with a signal proportional to the amplitude of signals outgoing from said junction, and means for selectively combining said mixed signals to produce a signal approximation to leakage signals traversing said junction.

9. The combination for use in an echo cancellation system, as defined in claim 8, wherein, said processing network develops selectively altered signals at Nyquist intervals of said signals incoming to said junction.

10. The combination for use in an echo cancellation system, as defined in claim 8, wherein, said processing network includes an arrangement of multidimensional orthonormal filters.

11. A system for cancelling echoes arising in nonlinear circuits, which comprises;

a network, supplied with signals from the first of two one-way transmission paths interconnecting said circuits, for producing a plurality of selectively adjusted product signals therefrom, means for selectively combining said adjusted product signals, means connected in the second of said two one-way paths for differentially combining signals in said second path with said combined product signals, and means responsive to said differentially combined signals for adjusting said product network.

12. Nonlinear synthesis apparatus which comprises, a network supplied with signals incoming to a nonlinear circuit for developing a plurality of selectively altered signals, means for combining said altered signals to produce a plurality of combinations of all of said altered signals taken *n* at a time, where *n* is selected to range from $n=1$ to $n=N$, means for selectively mixing of each of said combined signals with a signal proportional to the amplitude of signals outgoing from said nonlinear circuit, means for selectively combining said mixed signals to produce a signal approximation to nonlinear signals traversing said circuit, and means for differentially combining said signal approximation and said signals outgoing from said nonlinear circuit.

* * * * *